United States Patent [19]

Haffner et al.

[11] 4,149,362
[45] Apr. 17, 1979

[54] COMBINED LAWN MOWER AND GRASS CATCHER

[75] Inventors: Donald G. Haffner, Glendale; Merlin H. Gandrud, Sturtevant; Neill C. Woelfer, Racine, all of Wis.

[73] Assignee: Jacobsen Manufacturing Company, Racine, Wis.

[21] Appl. No.: 818,921

[22] Filed: Jul. 25, 1977

[51] Int. Cl.² .................... A01D 35/22; A01D 53/06
[52] U.S. Cl. ........................................ 56/202; 56/16.6
[58] Field of Search ............... 56/202, 203, 13.4, 16.6, 56/320.2

[56] References Cited

U.S. PATENT DOCUMENTS

| | | | |
|---|---|---|---|
| 2,918,694 | 12/1959 | Tarrant | 56/202 |
| 3,037,339 | 6/1962 | Nicholson | 56/13.4 |
| 3,110,998 | 11/1963 | Goldberg et al. | 56/202 |
| 3,112,597 | 12/1963 | Heth et al. | 56/202 |
| 3,367,091 | 2/1968 | Weiland | 56/13.4 |
| 3,398,514 | 8/1968 | Nolan | 56/202 |
| 3,553,947 | 1/1971 | Root | 56/202 |
| 3,568,421 | 3/1971 | Smith et al. | 56/202 |
| 3,636,686 | 1/1972 | Meyer et al. | 56/320.2 |
| 3,706,190 | 12/1972 | Taub | 56/202 |
| 3,872,656 | 3/1975 | Dahl | 56/202 |
| 3,928,956 | 12/1975 | Boxer | 56/202 |
| 3,949,540 | 4/1976 | Christopherson | 56/202 |
| 3,987,606 | 10/1976 | Evans | 56/202 |

Primary Examiner—Louis G. Mancene
Assistant Examiner—Paul J. Hirsch
Attorney, Agent, or Firm—Arthur J. Hansmann

[57] ABSTRACT

A combined lawn mower and grass catcher including a rotary type mower having a rearwardly directed discharge opening and a grass catcher mounted on the mower and extending to the rear thereof and within the lateral confines of the mower. A mower handle extends rearwardly of the mower with a portion thereof underneath the catcher for protecting and supporting the catcher if and when the latter extends down to the supporting portion of the mower handle. The catcher and the mower have inter-engaging members for attaching and removing the catcher relative to the mower, including a handle at the rear end of the catcher for attaching to the mower handle and for lifting the catcher. A spring-biased discharge opening door is mounted on the mower for engaging the front portion of the catcher and thereby securing the catcher so the mower under the influence of the spring acting on the mower door. The mower has a rotary cutter blade which operates on a cutting circle extending into the vertical plane of the forward portion of the attached catcher, and that vertical plane is also forward of the mower rear wheels, all for presenting the center of gravity of the mower and catcher in a forward position for optimum balance and minimum weight requirement for the mower itself.

12 Claims, 12 Drawing Figures

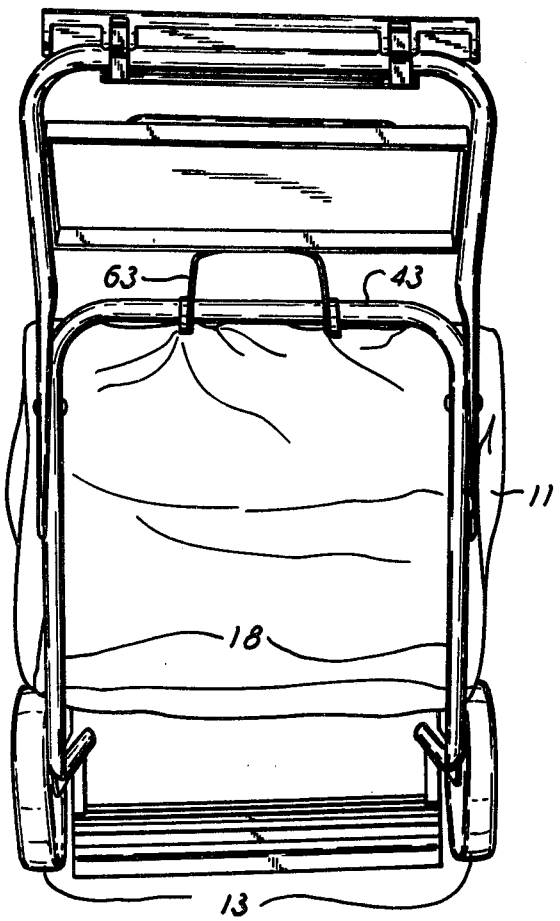
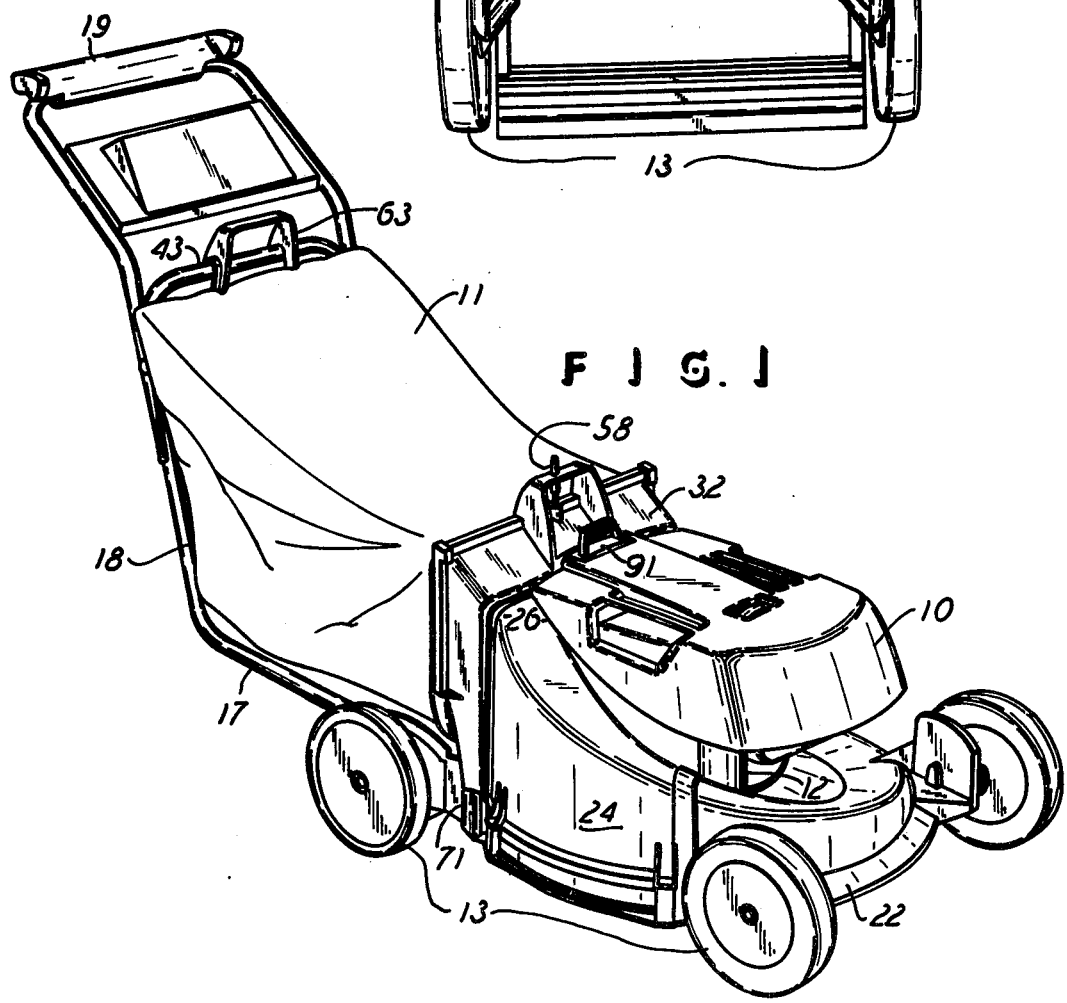

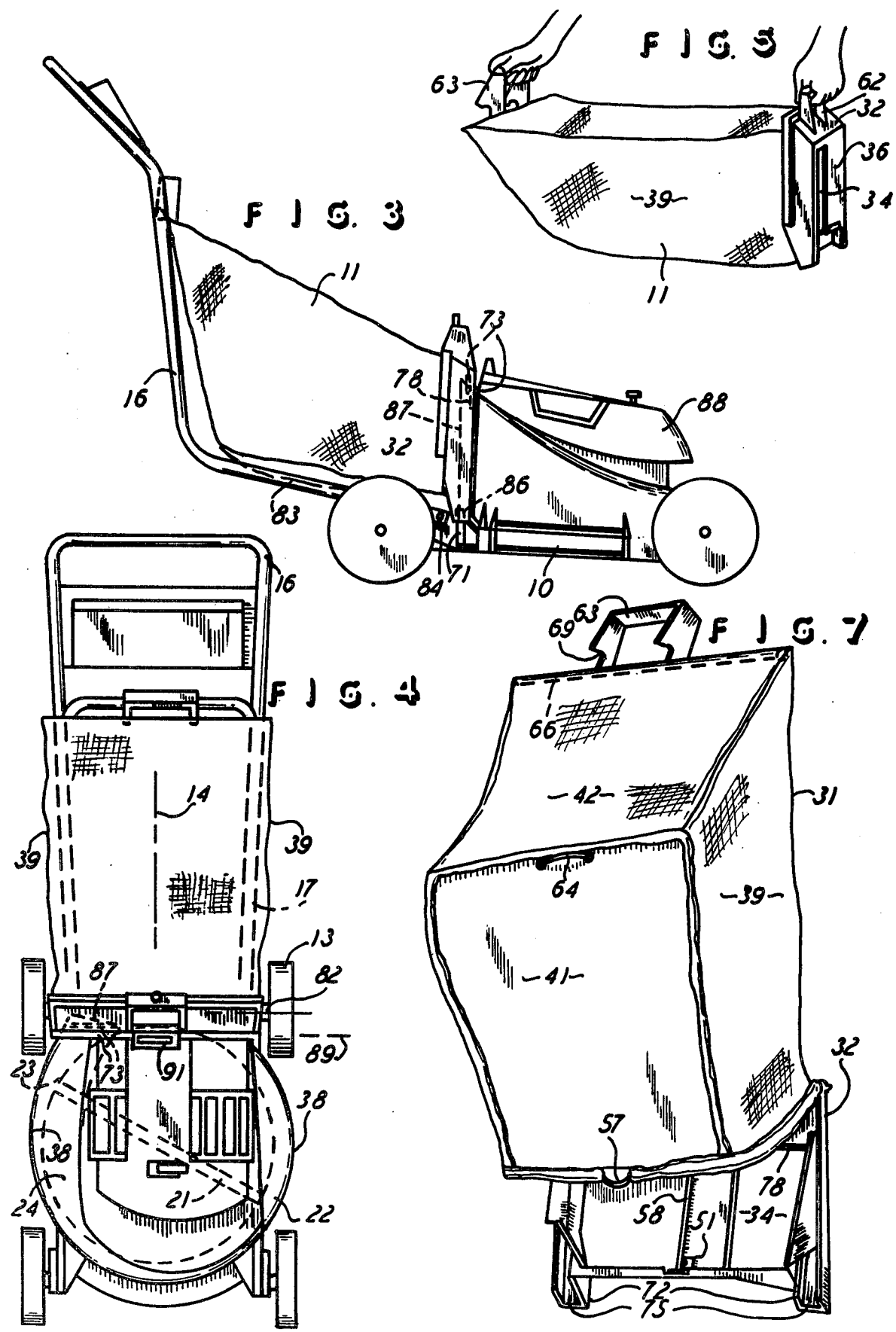

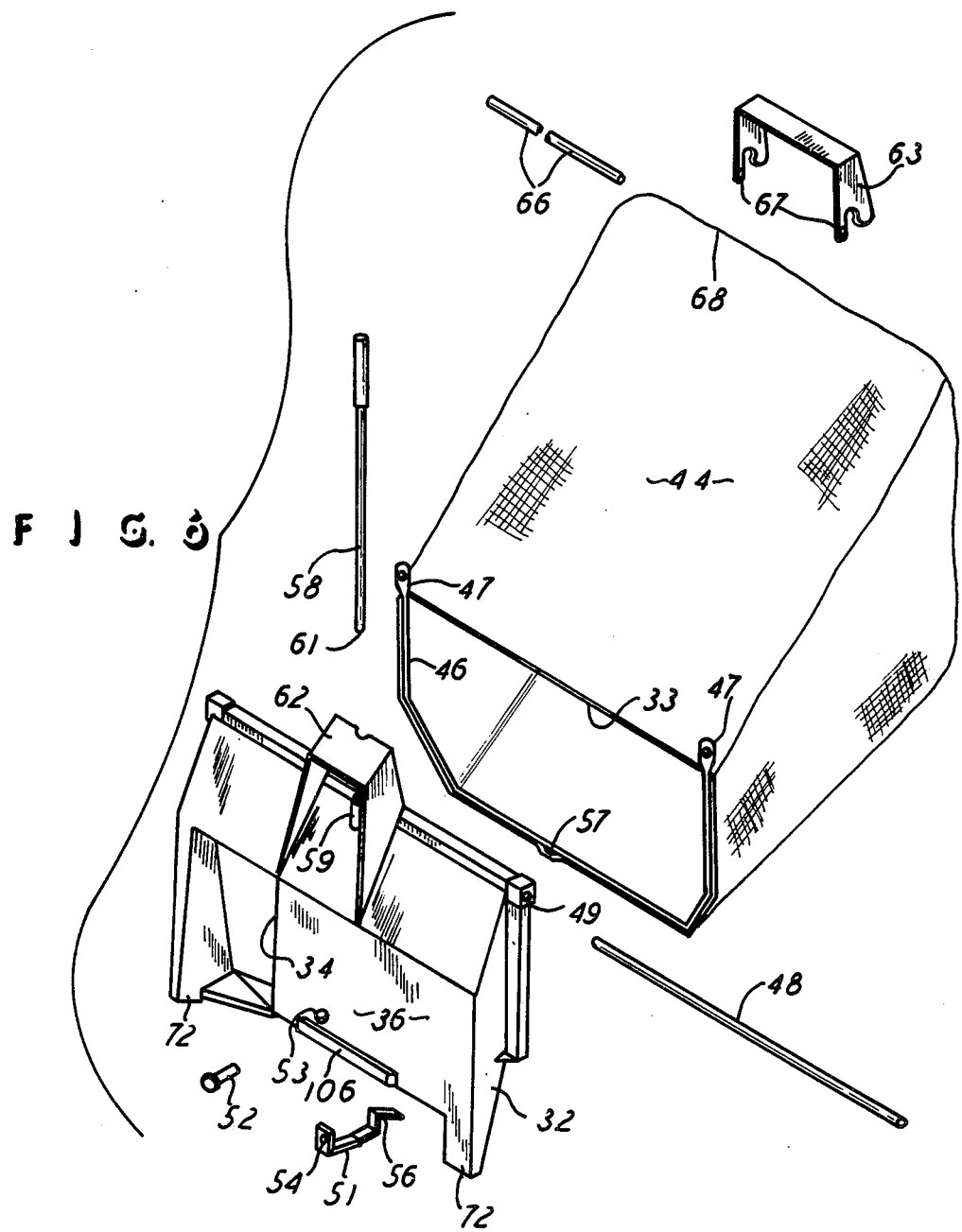

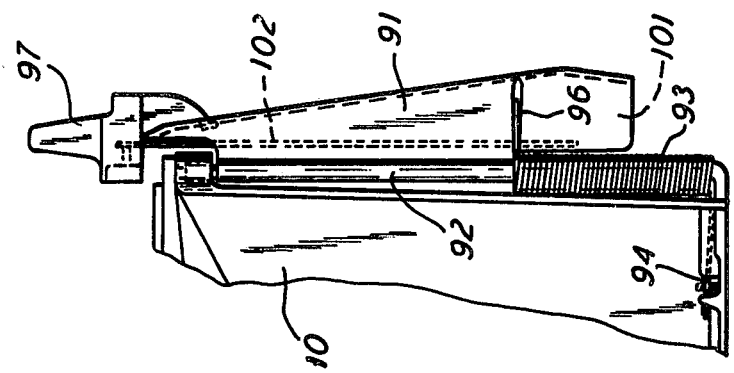
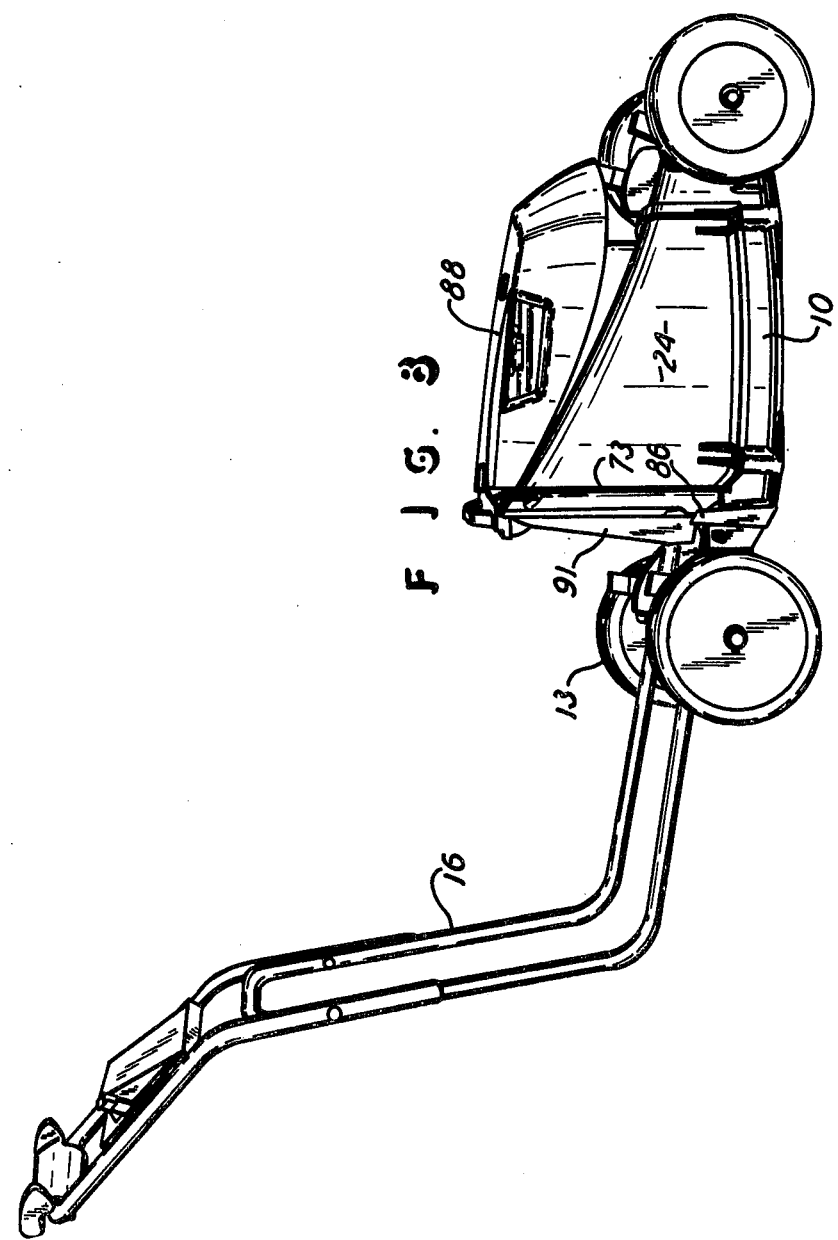

COMBINED LAWN MOWER AND GRASS CATCHER

This invention relates to a combined lawn mower and grass catcher, and, more particularly, it relates to a rotary type lawn mower having a grass catcher mounted directly to the rear of the mower and within the lateral confines of the mower.

BACKGROUND OF THE INVENTION

The prior art is already aware of rotary types of lawn mowers which have rearwardly mounted catchers thereon, and these catchers are commonly made of an air pervious material which receives the movement of air and grass clippings from the rotary mower and thus contains the clippings in a desired collected manner. Further, the prior art catchers are arranged for frequent attaching and removal of the catcher relative to the mower, and various catcher elements are provided so that the catcher can be adequately mounted and suspended relative to the mower. However, the most common arrangement is for the catcher to be in a cantilever arrangement. As such, the prior art catcher commonly tends to overbalance the mower and requires that the mower be of a substantial weight and heavy material and with the wheels thereof widely spaced to accommodate the overbalancing effect imposed on the mower by the catcher. Still further, the prior art bag-type catchers are commonly arranged in a manner to extend in directions which are simply to accommodate the location of the mower handle itself, and thus the location of the handle has priority over the location of the catcher, and the catcher is simply positioned in whatever space remains after the handle is designed and arranged relative to the mower. As such, the efficiency of the catcher and the detrimental effect of the weight of the catcher on the mower are factors in those prior art designs.

Examples of the prior art where bag types of catchers are mounted on mowers and the catchers are positioned with priority given to the position of the handle itself, but with the catcher supported from the handle are found in U.S. Pat. Nos. 2,720,071 and 2,970,421 and 2,973,614 and 3,706,190. Of those U.S. patents, only U.S. Pat. No. 2,720,071 shows a bag which is aligned with the mower and supported from the handle, but the disclosure is otherwise substantially different from the structural arrangement in this invention.

The prior art also is aware of the rotary type mower having a rearwardly extending bag which is in line or within the general confines of the lateral limits of the mower itself, such as seen in Australian Pat. No. 402,989 and U.S. Pat. Nos. 2,910,818 and 2,983,095 and 3,065,588 and 3,091,073 and 3,191,370 and 3,568,421 and 3,636,686. However, those prior art showings are of structures significantly different from that disclosed in this instance, and they do not show the catcher and mower arranged with interengaging members for ready and easy attachment of the catcher to the mower and for having the mower handle extend underneath the catcher and for having the catcher handles and the mower door and the center of gravity of the entire unit, all as mentioned in the aforesaid and is described herein.

Still further, the prior art is aware of other mower and catcher units where the bag type of catcher extends rearwardly but offset from the fore-and-aft axis of the unit, and U.S. Pat. Nos. 3,118,267 and 3,112,597 are examples of that arrangement; and still further the prior art is aware of arrangements of mower chute doors which are spring-biased to a closed position, such as found in U.S. Pat. Nos. 3,636,686 and 3,872,656 and 3,706,190, even though those arrangements are significantly different and are utilized for purposes distinct from that disclosed in the present instance.

Accordingly, it is a general object of this invention to provide an improved combined lawn mower and grass catcher, along the lines mentioned in the foregoing. Specifically, the present invention provides for a grass catcher which is aligned within the lateral limits of the mower itself and which has the mower handle extending underneath the catcher for support and protection and guidance of the catcher and which permits the catcher to be readily and easily attached to and removed from the mower. Still further, the mower and catcher are arranged so that the center of gravity of the combined unit, especially when the catcher is filled with grass clippings, is arranged in optimum position relative to the mower itself so that the mower can be of a minimum size and weight and still retain complete stability with a full catcher attached thereto. As such, the mower of this invention can be of a smaller size than the mowers of the prior art, even though the same cutting capacities are achieved in the comparisons between these mowers.

Another object of this invention is to provide a combined mower and catcher unit wherein the mower is arranged with a rearwardly directed discharge opening having a pivotal door operative over the opening and with the catcher and door arranged so that the door is spring-biased to abut a portion of the catcher when the catcher is mounted on the mower and thereby retain the catcher in a secured position on the mower.

Other objects and advantages will become apparent upon reading the following description in light of the accompanying drawings.

BRIEF DESCRIPTION OF THE DRAWINGS

FIG. 1 is a front perspective view of a mower with a catcher made according to this invention.

FIG. 2 is a rear perspective view of FIG. 1.

FIGS. 3 and 4 are side elevational and top plan views of the mower and catcher of FIG. 1.

FIG. 5 is a side perspective view of the catcher of FIG. 1 and removed from the mower.

FIG. 6 is an enlarged exploded view of the catcher of FIG. 1.

FIG. 7 is a bottom perspective view of the catcher of FIG. 1, and showing the door in the open position.

FIG. 8 is a side perspective view of the mower of FIG. 1 and with the catcher removed.

FIG. 9 is an enlarged side elevational view of the rear fragment of the mower of FIG. 1 and showing the chute door.

DETAILED DESCRIPTION OF THE PREFERRED EMBODIMENT

Figure 12:
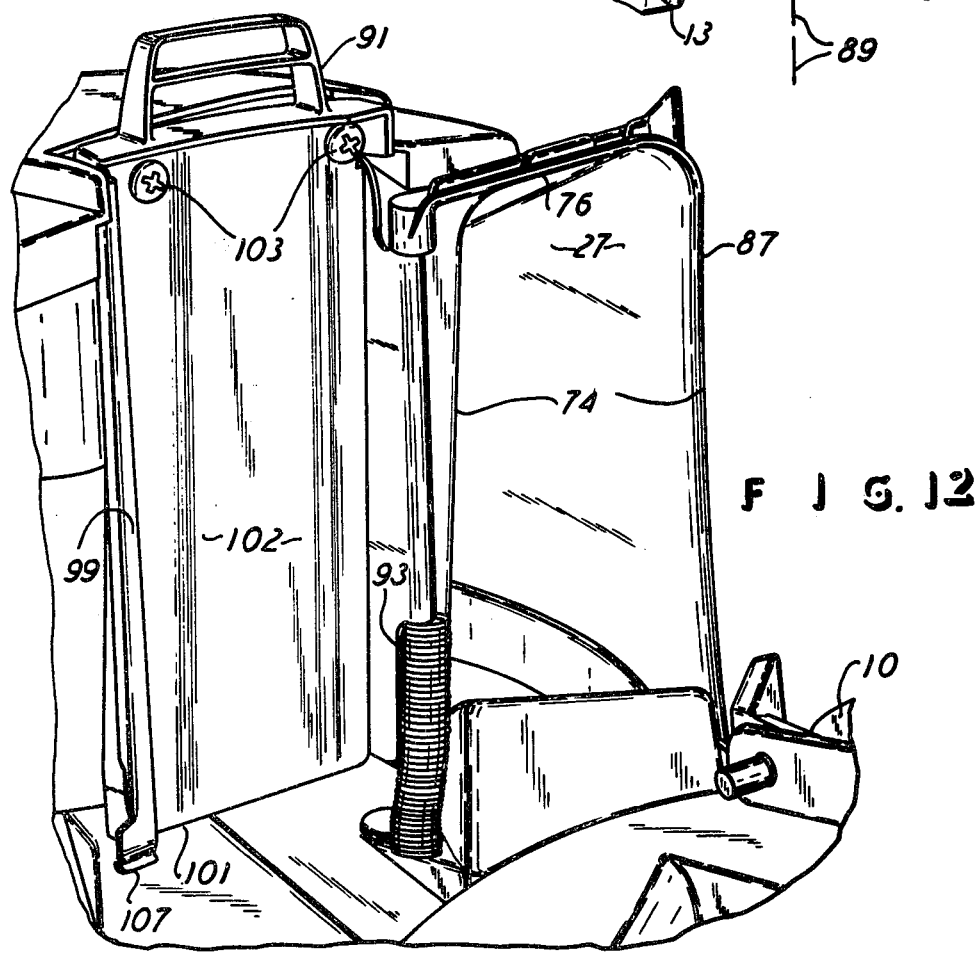
FIG. 12 is an enlarged rear perspective view of the rear fragment of the mower and showing the chute door in the open position.

The first two sheets of drawings show a rotary type of lawn mower 10 and a bag type of grass catcher 11 mounted on the mower 10. The mower 10 is of a conventional rotary type having a horizontally rotatable grass cutting blade, and a prime mover 12 is included in the mower 10 which also has four ground wheels 13 supporting the mower for movement generally in the fore-and-aft direction which is along the longitudinal or fore-and-aft axis of the mower, as designated 14 in FIG. 4. A mower handle 16 is suitably attached to the mower to actually be pivotal thereon and to extend first in a horizontal portion 17 and then an upright portion 18 and up to a hand grip 19 where the operator can grasp the handle and steer the mower in the usual course of mowing. Thus, there is a rotary type of mower having a blade such as the blade designated 21 in FIG. 4 which is enclosed in the mower housing 22 and which rotates on a blade circle designated 23 in FIG. 4. Operation of the prime mover 12 causes the usual and well known rotation of the blade 21 and thus cuts the grass and directs it around the confining mower housing 22 and up into the discharge chute 24. The rearwardly extending chute portion 26 has a grass discharge opening 27, such as shown in FIG. 12, and the grass is thus directed from the mower housing 22 and rearwardly of the mower and generally along the line of the mower fore-and-aft axis 14 and thus into the catcher 11.

FIGS. 5, 6, and 7 show the catcher 11 removed from the mower, and it will be noticed that the catcher has a body portion 31 which is made of a fabric or air pervious material so that the flow of air generated by the operation of the mower 10 can be directed through the bag body portion 31, in the usual arrangement of a bag type of grass catcher. Also, the catcher 11 has a front portion 32 made of rigid material, and that may be a plastic material, and that portion extends throughout the cross-section of the bag 11 and thus throughout the front opening 33 of the body portion 31, as best seen in FIG. 6. The portion 32 is in the nature of a door or an adapter which accommodates the mounting of the catcher 11 on the mower 10, all in a manner described in detail hereinafter. At this time, it will be seen and understood that the adapter 32 has a grass inlet opening 34 at one side of its front wall 36, and that opening 34 is in grass flow communication and registry alignment with the mower opening 27 when the catcher 11 is mounted on the mower 10. Thus the grass clippings and the flow of air move from the mower housing 22 and through its chute 24 and the mower discharge opening 27 and through the catcher opening 34 and into the catcher bag or body portion 31, all in a desired arrangement. Grass clippings are therefore accumulated in the bag portion 31, but the flow of air is permitted to continue through the bag portion 31 so that the collection of clippings and the expelling of air can be a continuous process in the operation of the combined mower unit.

FIG. 4 further shows that the mower housing 22 has lateral side limits designated 38, and those locations are the extreme lateral sides of the mower housing 22 and they are in line with the front and rear wheels 13, all as seen in FIG. 4. Further, the drawings show that the catcher 11 is symmetrically aligned with the mower fore-and-aft axis 14 and has its opposite side walls 39 aligned with the mower lateral limits 38, and thus the catcher 11 does not occupy more lateral space than that occupied by the mower 10 itself and the catcher walls 39 are actually within the lateral limits of the mower wheels 13 and are substantially aligned with the mower housing sides 38, as mentioned and shown. Accordingly, the mower can be maneuvered when the catcher is on the mower, and the catcher does not project laterally of the mower and is therefore not in the way for trimming action by the mower and the catcher will not encounter obstacles on the side of the mower such as trees and bushes or the like.

The arrangement of the mower and catcher is such that the catcher extends rearwardly of the mower and within the lateral limits of the mower itself, and the mower handle has its substantially horizontal portions 17 extending underneath the catcher 11 to upwardly support the catcher 11 in the event that the catcher 11 is filled with a weight or is so arranged that the catcher bottom wall 41 will rest down on the handle portion 17. Also, the handle 16 is generally of a U-shape and thus has its two side portions 17 and the two side portions 18 adjacent the catcher side walls 39 and adjacent the catcher back wall 42, all for serving as a frame or bumper-like structure protecting the catcher 11 from obstacles against which the mower could be directed in a steering or like action. FIGS. 2 and 4 show the mower handle portions 17, and also portions 18, to be spaced apart a distance less than the spacing between the catcher side walls 39. Of course the mower handle grip portion 19 extends above the uppermost level of the catcher 11, and the catcher is in no way interferring with the maneuverability of the mower or with the operator's view of the ground over which the mower is to be moved. Thus, the handle 16 is arranged to have a substantially right angle between its lower portion 17 and its upwardly directed portion 18, and thus optimum maneuverability and efficient control is achieved through that type of handle arrangement, in addition to providing for better accommodation of the catcher 11 and actual physical protection and support thereof, as described and as shown in the drawings. Therefore, the handle 16 has the two leg portions 17 and the two leg portions 18, as shown. Also, the handle 16 has a cross piece 43 which is located substantially intermediate along the length of the handle 16.

The catcher 11 presents an enclosure for the grass clippings, and thus it also has a top wall 44, and the catcher side walls, back wall, and top wall are preferably all of an air pervious fabric or canvas type material employed in the making of bag types of catchers, and actually the catcher bottom 41 can be of a wear-resistant and impervious material so that it will give a more rigid support to the bottom of the catcher and will resist the usual rotting and mildew problems of catchers. As mentioned, the catcher front opening 33 extends through the entire cross-section or girth of the front of the catcher 11, and also the door or adapter 32 extends through that full girth and is thus of the full width and full height of the catcher 11 at the front thereof. FIGS. 6 and 7 show the catcher includes a U-shaped rod 46 which is attached to the bag material and renders the front of the bag rigid and the rod upper ends 47 provide a hinge or pivot mounting for the catcher door 32, by means of the rod 48 extending through the U-shaped rod 46 and through an elongated opening 49 in the door 32. Further, the door 32 is hingedly or pivotally related to the remainder of the catcher 11 and thus swings between a closed position of FIG. 5 and an open position of FIG. 7, such as when the clippings are to be emptied from the catcher 11 and FIG. 7 shows the catcher in the designated vertical position where the clippings will fall from the catcher 11. A latch 51 is affixed to the door wall 36 by means of a fastener or rivet 52 extending through a hole 53 and into a hole 54 in the spring material latch 51. The latch 51 has an offset portion 56 which engages an offset portion 57 of the bag rod 46 to thereby hook onto the rod portion 57 and retain the door 32 in a closed position relative to the catcher bag portion 31.

To release the door 32 from its closed position and permit it to swing open, such as in FIG. 7, a release member or rod 58 extends through the catcher door 32, such as through the sleeve 59 on the door 32, and the rod 58 has its lower end 61 extend down to the latch 51 to thus force the latch portion 56 off the bag rod portion 57 and thereby permit the door 32 to swing open. In this arrangement, the entire front end or cross section or girth of the catcher is therefore opened and the clippings can be readily and easily removed from the catcher and will of course immediately fall from the catcher when the door 32 is opened by the simple expedient of depressing the release rod 58 to release the spring latch 51, as shown and as described.

Further, the catcher 11 is provided with three handles 62, 63, and 64, with the handles 62 and 63 being on the upper portion or top of the catcher 11 and with the handle 64 being underneath, as seen in FIG. 7. Therefore, as shown in FIG. 5, the operator's hands are seen supporting the catcher 11 in the horizontal or substantially operative position, rather than the emptying position of the catcher, and thus the catcher can be held and maneuvered for mounting on the mower and removal from the mower and for transport to a location for emptying the catcher. Thus, the handle 62 is affixed with the door 32 and extends adjacent the release rod 58 so that the operator can be holding the handle 62 with his fingers and yet have the thumb available for depressing the rod 58 when he desires to release the latch 51 for the emptying of the catcher.

FIG. 6 also shows that the handle 63 is attached as a part of the catcher 11 by means of a rod 66 which extends on the interior of the bag portion 31 and along the corner between the rear wall 42 and the top 44, and the handle 63 has holes 67 through which the rod 66 extends for making the interconnection between the bag portion 31 and the rod 66 and the handle 63. As such, the rod 66 gives rigidity to the bag at the juncture designated 68 which is the upper corner thereof. Other than that, the remainder of the bag portion 31 is free to fold or bend or flex, except of course for the front U-rod 46 and the door 32, and thus the bag 11 can be easily manipulated for mounting and removal relative to the catcher and for storage or the like. Of course the bag portion 31 is affixed, such as by sewing, to the U-shaped rod 46, and thus the entire assembly and arrangement of the parts shown in FIG. 6 will be understood by one skilled in the art.

Also, the catcher three handles are spaced apart from each other and around the catcher 11 such that the two handles 62 and 63 serve for the mounting and removal of the catcher relative to the mower and for carrying the catcher, and the handles 63 and 64 are available for holding the catcher in the emptying position of FIG. 7 when the door 32 has been released and permitted to swing open by gravity, since the handle 63 and the door hinge 48 are then in substantially the same vertical plane and thus holding the handle 64 will properly position the catcher 11 for complete and easy emptying.

It will also be seen and understood by one skilled in the art that the mower 10 and the catcher 11 have interengaging portions or members which readily and easily permit the mounting of the catcher 11 on the mower 10 and the readily and easy removal thereof. Thus, the door or adapter 32 is attached to the mower 10 at the rear thereof by simply sliding downwardly onto the mower 10, and the catcher handle 63 is simply positioned onto the mower handle crosspiece 43 for supporting the rear end of the catcher 11 relative to the mower 10. For this purpose, the catcher handle 63 has downwardly opened notches 69 which simply rest down on the mower handle crosspiece 43. As such, the catcher 11 has its portions or connectors for attaching to the mower 10, and the very same handles 62 and 63 which are gripped by the operator for positioning the catcher 11 relative to the mower 10 are also utilized for carrying the catcher 11, such as in FIG. 5, and thus maximum efficiency and ease of the entire function is achieved.

The interconnection between the catcher adapter 32 and the mower 10 is by means of interconnecting members or tracks and projections between the mower and catcher. Thus, both opposite sides of the mower housing 10 have an upstanding block or member 71 which nests with the channel-shaped lower ends 72 of the adapter 32 to retain the adapter 32 forwardly on the mower 10 and at the lower end of the adapter 32. The mower chute end 26 has two spaced-apart tracks 73, with the forwardly-located track 73 extending vertically for the height of the chute end 26 and the rearwardly-located track 73 being a short track and extending spaced from the longer track 73, such as seen in FIGS. 3 and 8, for instance. Further, the chute end 26 is of a relatively narrow width, compared to the entire width of the mower 10, and it therefore has side walls 74 extending vertically and at the rear of the chute end 26 and defining the opening 27, along with the chute top wall 76, as shown in FIG. 12. With that arrangement, the adapter opening 34 can fit over the chute rear end 26 when the adapter lower ends 72 are aligned with the alignment and confining mower members 71, all for registering the adapter opening 34 with the chute discharge opening 27. Further, when the adapter 32 is positioned to its finally assembled and vertical position as seen in FIGS. 1 and 3, for instance, then the adapter wall edge 78 of FIGS. 3 and 7 will be received between the chute tracks 73 for aligning and positioning the adapter 32 in the grass-flow communication with the chute end 26. By virtue of the planar and rigid construction of the adapter 32, that is since it extends across the front of the bag portion 31, and by virtue of the adapter handle 62, the front end of the bag 11 can be readily and easily attached to and removed from the mower 10 by respective down and upward movements and the alignment and attachment is simply and readily accomplished. In the operation of attaching the adapter 32 to the mower 10, the rear end of the catcher 11 can be simply draped or supported on the mower handle crosspiece 43 by means of the catcher handle 63, and the operator can then release the handle 63 and have two hands available for controlling the adapter 32 and for controlling a chute closure door 91 which is described later. At this time it will be noticed and understood that the catcher 11 actually extends to within the vertical projection of the mower 10 and to a significant and substantial amount from the rear of the mower 10, as clearly shown in FIGS. 1, 3, 4, and as apparent from FIG. 8. That is, the adapter 32 is positioned in a vertical plane, and that vertical plane is actually forwardly of the axis designated 82 of the mower rear wheels 13. Still further, the vertical plane occupied by the adapter 32 is within the circle 23 of the rotation of the cutter blade 21, and that further physically describes and characterizes the unique forward location of the end of the catcher 11 which actually connects with the mower 10. To elaborate upon that physical relationship of the forward location of the catcher 11 relative to the mower 10, it is to be seen and understood that the mower chute rear end 26 terminates with its opening 27 which is substantially forwardly of the vertical plane of the mower rear wheels 13, and that vertical plane is also at least substantially coincident or within the cutter blade tip circle 23, as described and as indicated in FIG. 4. As such, in a standard 21-inch swath type of rotary mower, for instance, the mower discharge chute opening 27 is located approximately five or six inches in front of the vertical plane of the rear wheel axis 82, and the blade cutter circle tip 23 extends to within that vertical plane, that is it extends beyond the plane of the discharge opening 27. The arrangement therefore permits a significantly lower weight and therefore less material for the entire mower 10 since the combined mower 10 and bag 11 are of an optimum balanced arrangement with the center of gravity of the combination sufficiently balanced on the ground wheels 13 even when the bag 11 is filled with grass clippings. This permits the mower to be made of less material and lighter weight materials and it need not be of a size and weight to simply provide counterbalance for a bag full of grass clippings, and in actual practice, the mower housing 22 can be of a weight as low as 10 or 12 pounds, compared to approximately twice that weight for other mowers of comparable cutting capacities. Still further, the mower of this invention is of a length shorter than mowers of comparable capacities, and the amount of saving in overall length is as much as ten per cent in that comparison. In summary, the mower of this invention is of a lighter weight, requires lesser materials and inherently materials of lighter weight, and the mower can be of a smaller size, including the length of the mower, all as compared to conventional and commercial mowers now on the market and of at least a comparable cutting capacity. In effect, the center of gravity of the combined unit of the mower and catcher of this invention is actually shifted forward and is therefore fully and stably balanced by the usual and conventionally-located ground wheels 13 which are located in their customary positions relative to a rotary mower housing, such as the housing 22.

With further regard to the relationship of the catcher 11 and the mower 10, it will be understood that the mower handle 16 protects and supports the bag 11, and FIG. 3 shows in dot-dash lines 83 the position that can be occupied by the catcher 11 at the bottom thereof, and thus the catcher 11 is supported by the mower handle 16 when necessary and appropriate, and that weight of the catcher 11 and its contents can be then transferred to the mower through the handle 16 and at its point of pivotal connection 84. Again, the point 84 is forward of the rear wheels 13, and the stability of the mower is thus enhanced and the shorter and lighter-weight mower 10 is therefore accomplished. That is, where the weight of the catcher 11 is suspended only from a rear portion of the catcher 11, such as at the catcher handle 63 on the mower handle cross piece 43, the mower 10 would be required to counterbalance all of that weight on the cross piece 43, but not in the present arrangement.

As shown and as mentioned above, the catcher adapter or door 32 readily and easily hooks onto the mower 10, and this is accomplished by having the adapter lower ends 72 channel-shaped, at 75 as seen in FIG. 7, and these channel shapes nest over the upstanding bosses 86, to thus secure and locate and anchor the lower end of the adapter 32 relative to the mower, 86 is the upper end of the boss 71. As previously mentioned, the adapter is also nested with the mower tracks 73 which protrude from the rear end 26 of the chute 24, and thus the adapter or door 32 simply slides down onto the chute 24 for ready and secure mounting on the mower 10. Thus, the adapter with its opening 34 surrounds the chute rear edge 87, and that edge 87 of course defines the chute rear discharge opening 27 which, as mentioned, is located forwardly of the blade circle 23, and thus the adapter front wall or panel 36 is also forwardly of the blade circle 23, all for the achievement of the lower weight and shorter length of mower 10, as mentioned. Of course the prime mover or engine 12 is disposed to be forward of the adapter 32, and the engine cover or shroud 88 is forward of the adapter 32. Thus, the mower 10 has a rear portion rearwardly disposed relative to that fore-and-aft axis 14, and the rear portion incorporates the chute rear end 26 and the rearwardly disposed end of the shroud 88, all as located along and defined by the transverse line designated 89 in FIG. 11. With that arrangement, the mower housing has its grass clipping discharge opening 27 directed rearwardly of the housing and toward the handle 16 and substantially in line with the handle 16 but located to one side of the central axis 14, and that is actually the right side of the mower 10 from the operator's position, and as shown in the drawings. Thus the line 89 represents an upright or even vertical plane at the rear of the mower 10 and extending transverse to the longitudinal axis 14 and being located as described and shown.

Figure 10:
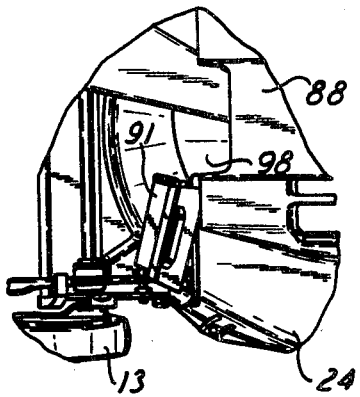
FIGS. 10 and 11 are enlarged top perspective views of the rear fragment of the mower of FIG. 1, and showing the chute door in the closed and open positions, respectively.

To assure versatility of the mower and compactness thereof a mower discharge opening door 91 is hingedly mounted on the mower at the rear thereof for swinging about a vertically disposed hinge pin 92 shown in FIG. 9. The versatility is such that the mower 10 can be used without the catcher 11, and that is the mode shown in FIGS. 8 and 9 and 10 where the mower chute door 91 is in the spring-biased closed position over the chute opening 27. Of course when it is desired to use the catcher 11, then the door 91 is swung to the open position, shown in FIGS. 11 and 12, and then the discharge opening 27 is in grass flow communication with the catcher inlet opening 34 when the catcher is mounted on the mower 10.

Figure 11:
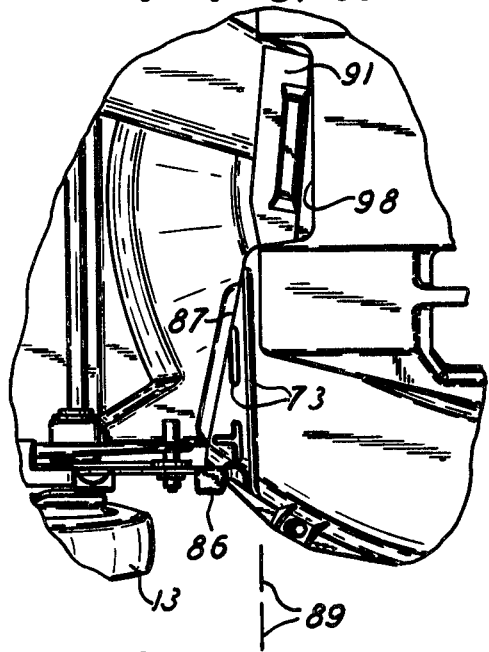

Thus FIG. 9 shows the mower rear portion has the hinge pin 92 affixed thereon, and a coil spring 93 is piloted on the pin 92 and is anchored on its one end 94 and engages the door 91 at its other end 96, all to spring urge the door 91 to the closed position. A handle 97 on the upper end of the door 91 is available for swinging the door to the open position when it is desired to mount the catcher onto the mower 10. Further, the engine shroud 88 has a recess 98 which receives the door 91, as shown in FIGS. 11 and 12, when the door is in the open position and thus exposing the discharge opening 27 and moving out of the way of the adapter 32. Further, the arrangement is such that the door edge 99 is spring-urged toward the adapter 32 and will actually be pressing against the adapter front face 36, under the tension of the spring 93, and thus the adapter 32 is held into position by gravity and also by the pressure from the spring 93 applied through the door 91. Of course whenever the catcher 11 is not mounted on the mower 10, then the door 91 will immediately and automatically go to its closed position to thus be enclosed over the discharge opening 27 and preclude the movement of air and other material in the horizontal path through the opening 27.

In the closed position for the door 91, the air and grass and like material impelled by the rotating cutterbar 21 will be directed through the chute 24 and against the door 91, and that material will be permitted to fall below the door 91 at the lower opening 101 defined by the channel shape of the door 91 at its lower end. That is, the impelled material will be directed to the door 91 and will fall to the inside of the door 91 and therebelow by means of a space or opening 101 defined by the three-sided channel-shaped door 91, as shown. Again, the extended door edge 99 will engage the chute edge 87 to thus provide the lower opening 101 between the door 91 and the mower itself, so that the air and grass and the like can actually fall through or below the door 91, as described in connection with the space 101.

In this aforesaid arrangement, the door 91 is hinged on the mower adjacent the central axis 14 so that the door swings toward the center of the mower and thus again presents the compact mower. Of course the door is capable of swinging through approximately 180 degrees so that the vertical rear plane 89 is maintained as shown and described in connection with FIG. 11, again for the functions described and the compactness of the entire unit.

Another feature is the provision of an impact panel 102 which is affixed to the door 91 by means of screws 103 and the panel is free to drape from the screws 103 and along the inside of the door 91, as shown in FIGS. 9 and 12. Thus, the panel 102 is made of a resilient but tough material to serve as an impact panel for objects striking the panel 102 and thereby dampen the flight of the object and any noise or like considerations. Thus the air moving through the chute 24 and against the dampening or impact panel 102, along with any objects moving against the panel 102 will lose their energy by displacing the panel 102 rearwardly within the door 91 and thus serve the purpose of dampening the effect of the flight but still permit the material to drop through the space 101, as mentioned. A further dampening effect is achieved through the arrangement of the spring 93 acting on the door 91 and that is against the force of the air and material moving through the chute 24 and toward the door 91. By virtue of the air space or gap 101, as described, only a minimal spring force 93 is required to hold the door 91 in the closed position as described, and thus the door 91 can function to dampen the force of material moving thereagainst, also as described, and it can further function to exert the spring pressure against the adapter 32 when the door is in the open position and that spring pressure will not be excessive on the door 32 but will be adequate for holding the adapter or door 32 in the seated position described. The panel 102 is preferably made of a rubber or like material to serve as a dampener or impact panel as described and as shown.

Accordingly, it will be understood that the prime mover 12 is preferably a gasoline engine which therefore normally occupies a substantial amount of space, but the entire arrangement of the engine 12 and the housing 22 and the shroud 88 and the like are all such that the mower chute end 26 can terminate, and the shroud 88 can also terminate, along the plane designated by the line 89. Still further, for compactness and the functions mentioned, the mower handle 16 extends underneath the catcher 11 to be out of the way of the catcher 11 which is therefore not arranged, sized, and mounted simply to accommodate the mower handle. While the handle 16 is described as being pivotal relative to the mower, it is of course to be understood that the connection with the mower is actually a releasable pivotal connection such that the handle 16 is in a set position relative to the mower but can be released and then pivoted relative to the mower, in the usual arrangement of a pivotal handle on a rotary mower. Also, the catcher bottom 41 has been described as being of a material different from that of the remainder of the bag portion 31, and actually the bottom 41 is of a substantially rigid material which is self-supporting and which will therefore remain significantly planar and will therefore give the flat configuration and support across the bottom of the catcher portion 31, and the actual material for the bottom can be a plastic material such as a polypropylene. Further, for purposes of intercepting materials moving through the chute 24 and into the catcher 11, the catcher rear wall 42 can be lines with an impact material to intercept any objects moving forcefully into the catcher 11.

The adapter 32 has a projection 106 on its face 36, and the door 91 has a projection 107 extending toward the face 36 and in abutment with the projection 106 when the adapter is mounted on the mower. Thus the projection 107 is above and in contact with the projection 106 and holds the adapter 32 down and against unwanted raising and release of the adapter relative to the mower. However, the operator can lift the adapter 32 against the holding force of the projections to overcome same when it is desired to remove the catcher, and such overcoming is effected by the lifting of the adapter which causes it to press against the door 34 and against its spring force, for the release and removal described.

What is claimed is:

1. A combined lawn mower and grass catcher, comprising a mower for fore-and-aft movement over the ground in the cutting of grass and having a grass clipping discharge opening directed rearwardly on said mower, a grass catcher removably attached to said mower and extending rearwardly thereof and having a bag portion of spaced-apart opposite side walls and a bottom and a back and a top extending between said side walls and said catcher being in grass-flow communication with said discharge opening for receiving grass clippings from said mower, said catcher being of a width of substantially the width of said mower and aligned therewith to be directly behind said mower, said catcher bag portion being of an air pervious material except for said bottom which is of an air impervious and more rigid material relative to said pervious material, and a mower handle connected to said mower and extending rearwardly therefrom and having portions spaced apart a distance less than the width of said bottom of said catcher and extending underneath said catcher for supporting said catcher when said catcher extends down to said mower handle portions.

2. The combined lawn mower and grass catcher as claimed in claim 1, wherein said handle is angular along its length and said portions are adjacent said mower and extend substantially horizontally underneath said catcher, and said handle has additional portions angled relative to the first said portions and extending upwardly to an elevation above the uppermost elevation of said catcher, for being gripped by the operator in the steering of said mower.

3. The combined lawn mower and grass catcher as claimed in claim 2, wherein the angle between said handle portions is substantially a right angle.

4. The combined lawn mower and grass catcher as claimed in claim 2, wherein said handle is U-shaped to present said portions.

5. The combined lawn mower and grass catcher as claimed in claim 1, wherein said catcher has a grass clipping inlet opening, said catcher being free of rigid frame members throughout the extent of said bag portions to thereby have said bag portion flexible and flexible downward to rest on said handle portions, said catcher and said mower include inter-engaging members for removably attaching said catcher to said mower and with said catcher opening and said mower discharge opening being in registry for grass clipping flow communication, and a connector on said catcher for removably connecting said catcher to said handle.

6. The combined lawn mower and grass catcher as claimed in claim 5, wherein said mower includes a spring-biased door disposed over said discharge opening and being spring-urged to a closed position for blocking grass flow through said discharge opening when said door is in the closed position, said catcher including a portion extending adjacent said door when said door is open and said catcher is attached to said mower, and said spring-biased door being disposed and arranged to be spring-urged against said catcher portion when said door is open.

7. A combined lawn mower and grass catcher, comprising a rotary mower for fore-and-aft movement over the ground in the cutting of grass and having a grass clipping discharge opening directed rearwardly on said mower and located intermediate the lateral limits of the opposite sides of said mower, an enclosed grass catcher removably attached to said mower and extending rearwardly thereof and having a grass inlet opening in grass-flow communication with said discharge opening for receiving grass clippings from said mower, said catcher being of a width substantially that of said mower and aligned therewith to be directly behind said mower, a mower handle connected to said mower and extending rearwardly thereof, said handle having two portions attached to said mower and spaced apart a distance less than said width of said catcher and extending underneath said catcher, said catcher having a bottom resting on said handle portions, said catcher and said mower having inter-engaging members for removably attaching said catcher to said mower to have said mower and said catcher openings in grass-flow communication, and a handle on said catcher removably hooked onto said mower handle for removably attaching said catcher to said mower handle and for lifting said catcher off said mower handle.

8. The combined lawn mower and grass catcher as claimed in claim 7, wherein said mower includes a spring-biased door disposed over said discharge opening and being spring-urged to a closed position for blocking grass flow through said discharge opening when said door is in the closed position, said catcher including a portion extending adjacent said door when said door is open and said catcher is attached to said mower, and said spring-biased door being disposed and arranged to be spring-urged against said catcher portion when said door is open.

9. The combined lawn mower and grass catcher as claimed in claim 7, wherein said mower handle has a cross piece intermediate the length of said handle, and said catcher handle being removably hooked onto said cross piece.

10. A combined lawn mower and grass catcher, comprising a rotary mower having a grass clipping discharge opening, an enclosed grass catcher removably attached to said mower through vertical movement and having a grass inlet opening in grass-flow communication with said discharge opening for receiving grass clippings from said mower, a spring-biased door disposed on said mower and extending over said discharge opening and being spring-urged to a closed position for blocking grass flow through said discharge opening when said door is in the closed position, a portion of said catcher extending adjacent said door when said door is open and said catcher is attached to said mower and with said door being spring-urged toward and in contact with said portion, said door and said catcher portion having inter-engaged projections with the projection of said door being above the projection of said catcher portion to thereby have said spring-urged door hold said catcher portion downwardly on said mower and maintain engagement of said inter-engaged projections against unwanted removal from said mower until said door is swung clear of said catcher and said catcher portion is lifted off said mower.

11. The combined lawn mower and grass catcher as claimed in claim 10, wherein said projection on said catcher protion extends toward said door when said door is in the open position, and the spring-biasing of said door being in the direction of said catcher portion for yielding holding said catcher portion downwardly on said mower.

12. A combined lawn mower and grass catcher, comprising a rotary mower for fore-and-aft movement over the ground in the cutting of grass, said mower having a housing with a discharge chute extending upwardly and rearwardly from the front of said housing and terminating at the rear of said housing, said chute having a grass clipping discharge opening directed rearwardly on said mower and located intermediate the lateral limits of the opposite sides of said mower, a pair of front ground wheels and a pair of rear ground wheels on said mower, an enclosed grass catcher removably attached to said mower and extending rearwardly thereof and having a grass inlet opening in grass-flow communication with said discharge opening for receiving grass clippings from said mower, said catcher being of a width substantially that of said mower and aligned therewith to be directly behind said mower, said catcher and said mower having inter-engaging members for removably attaching said catcher to said mower to have said mower and said catcher openings in grass-flow communication, said inter-engaging members being located on a vertical plane forward of the vertical plane of said rear ground wheels for positioning of said catcher toward the front of said mower to have the center of gravity of the combined mower and catcher central relative to said front ground wheels and said rear ground wheels, a cutter blade rotatable on said mower and having a cutting circle extending to the rear of said mower to a vertical plane within the vertical plane of said inter-engaging members, and a handle connected to said mower at a location forward of said vertical plane of said rear ground wheels, and said handle extending underneath said catcher for further supporting said catcher on said mower at the location between said front ground wheels and said rear ground wheels.

* * * * *